United States Patent
Trice et al.

(10) Patent No.: US 11,204,173 B2
(45) Date of Patent: Dec. 21, 2021

(54) SEVEN BURNER DIGITAL COOKTOP WITH RE-CONFIGURABLE WOK AND GRIDDLE BURNER

(71) Applicant: Midea Group Co., Ltd., Foshan (CN)

(72) Inventors: Daniel J. Trice, Louisville, KY (US); Richard W. Cowan, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 238 days.

(21) Appl. No.: 16/588,784

(22) Filed: Sep. 30, 2019

(65) Prior Publication Data
US 2021/0095854 A1    Apr. 1, 2021

(51) Int. Cl.
| | |
|---|---|
| A47J 37/06 | (2006.01) |
| F24C 3/12 | (2006.01) |
| F24C 3/00 | (2006.01) |
| F24C 15/18 | (2006.01) |
| F24C 3/08 | (2006.01) |

(52) U.S. Cl.
CPC ........... *F24C 3/124* (2013.01); *A47J 37/0682* (2013.01); *F24C 3/008* (2013.01); *F24C 3/085* (2013.01); *F24C 3/126* (2013.01); *F24C 15/18* (2013.01)

(58) Field of Classification Search
CPC .......... F24C 3/124; F24C 3/008; F24C 3/126; F24C 3/085; A47J 37/0682
USPC ...................................... 126/39 BA
See application file for complete search history.

(56) References Cited

U.S. PATENT DOCUMENTS

| | | | |
|---|---|---|---|
| 3,476,315 A * | 11/1969 | Biggle | F24C 3/128 236/15 A |
| 5,662,465 A | 9/1997 | Kano | |
| 6,619,613 B1 | 9/2003 | Akamatsu et al. | |
| 7,527,495 B2 | 5/2009 | Yam et al. | |
| 9,723,954 B2 | 8/2017 | Bringe et al. | |
| 9,791,156 B2 | 10/2017 | Cadima | |
| 9,841,191 B2 | 12/2017 | Johncock et al. | |
| 9,995,490 B2 | 6/2018 | Cadima | |
| D825,249 S | 8/2018 | Kang et al. | |
| 10,222,070 B2 | 3/2019 | Cadima | |
| 2002/0190057 A1 | 12/2002 | Staebler et al. | |
| 2004/0007566 A1 * | 1/2004 | Staebler | H05B 3/74 219/445.1 |
| 2004/0177844 A1 | 9/2004 | Rummel et al. | |
| 2005/0142511 A1 * | 6/2005 | Yam | F24C 3/085 431/285 |
| 2007/0151556 A1 | 7/2007 | Cadima | |
| 2010/0263657 A1 | 10/2010 | Ryu et al. | |

(Continued)

FOREIGN PATENT DOCUMENTS

| | | |
|---|---|---|
| CN | 203671667 U | 6/2014 |
| CN | 104633660 A | 5/2015 |

(Continued)

OTHER PUBLICATIONS

International Search Report and Written Opinion issued in Application No. PCT/CN2020/097875 dated Sep. 29, 2020.

*Primary Examiner* — Avinash A Savani
(74) *Attorney, Agent, or Firm* — Middleton Reutlinger (57) ABSTRACT

A digital cooktop system with six regular burners and a wok burner, allowing use of a reconfigurable control knob to control the cooktop burners for a wok mode, a griddle mode, and a six-burner mode.

20 Claims, 5 Drawing Sheets

(56) References Cited

U.S. PATENT DOCUMENTS

| | | | | |
|---|---|---|---|---|
| 2012/0199113 A1* | 8/2012 | Barrena | ................... | F24C 3/12 |
| | | | | 126/39 BA |
| 2014/0261009 A1* | 9/2014 | Bringe | ................ | A47J 37/0682 |
| | | | | 99/340 |
| 2016/0050720 A1* | 2/2016 | Jeanneteau | ............. | F24C 7/083 |
| | | | | 219/445.1 |
| 2016/0095169 A1* | 3/2016 | Sanchez | ................ | H05B 6/062 |
| | | | | 219/622 |
| 2016/0334109 A1 | 11/2016 | Krohn | | |
| 2017/0219215 A1* | 8/2017 | Hui | ........................ | F24C 7/083 |
| 2017/0227235 A1 | 8/2017 | Best et al. | | |
| 2017/0261211 A1* | 9/2017 | Paitchell | .................. | F24C 3/085 |
| 2018/0187885 A1 | 7/2018 | Manrique et al. | | |

FOREIGN PATENT DOCUMENTS

| | | | |
|---|---|---|---|
| CN | 106838998 A | 6/2017 | |
| CN | 207648865 U | 7/2018 | |
| CN | 109084340 A | 12/2018 | |
| CN | 109282317 A | 1/2019 | |

\* cited by examiner

SEVEN BURNER DIGITAL COOKTOP WITH RE-CONFIGURABLE WOK AND GRIDDLE BURNER

BACKGROUND OF THE INVENTION

To provide consumers with flexibility in their cooking methods, cooking appliances typically include multiple burners and different cooking functions. Flexible cooktops having multiple burners with different BTU ratings are common, as it is advantageous to consumers to allow them to use burners with different heat output to meet their specific cooking needs. For the same reasons, a cooking appliance incorporating different cooking functions such as a wok, a griddle, a fish poacher, a grill, an oven, an induction heating element, or the like in a single unit is the trend in the appliance industry.

With cooking appliances becoming increasingly multimodal, the use of a wok with the cooking appliance is gaining popularity as well. Wok cooking, which involves a stir-frying technique, usually requires cooking of vegetables and meat for a very short time period at a very high temperature. For a typical stir-frying recipe, the cooking time is three to five minutes or less. The health benefits of wok cooking are substantial: less fat is absorbed by the food being cooked in a wok with a shorter time period compared with traditional methods, resulting fat intake by consumers is at a minimum. In addition to the health benefits, the flavor of the food being cooked in a wok, particularly vegetables, is substantially retained by the high heat searing of the food surfaces.

However, it may be quite difficult to stir-fry on a conventional gas cooktop because of the insufficient amount of heat generated by the average cooktop burners. The surface temperature of the wok needs to be heated up to over 700° F. to meet wok cooking needs. Restaurants can attain the high temperature required to stir-fry by using commercial burners that are able to reach over 200,000 BTU's heat output. However, typical household cooktop burners only have an average 7,000 to 18,000 BTU's heat output.

To provide multiple different types of cooking functions mentioned above, an additional surface burner usually needs to be installed on a top of a cooking appliance. Additionally, cooking appliances including a griddle function have become increasingly popular, and are standard features on many stoves and cooktops. The griddle surface is considered ideal for cooking large quantities of food which would otherwise be pan fried, such as eggs, bacon, sausages, pancakes, quesadillas, etc. The griddle is usually heated up to an adjustable temperature range between approximately 200 to 500° F. evenly across an entire cooking surface of the griddle. To use the griddle cooking function with a typical cooking appliance such as a stove or a cooktop, a griddle may be placed over multiple burners of the cooking appliance. Those multiple burners provide flame ports to heat the cooking surface of the griddle up to the required temperature. Generally, users of the griddle have to carefully adjust each burner covered by the griddle in an attempt to balance the heat applied to the cooking surface of the griddle. Providing a substantially uniform heat gradient across the griddle cooking surface may be difficult by individual, independent, or separate control of the burners. Meanwhile, although most cooking appliances today are equipped with a plurality of cooktop burners, traditional burners located on a cooktop are typically spaced apart and are not designed to cooperate with one another to accommodate the shape and design of the griddle mounted over the burners. In addition, the maximum number of burners on a traditional 30" cooktop is six, but there is a need to have more burners with a new configuration to provide more flexibility to consumers.

From the foregoing it can readily be seen that there is a need in the art for an advanced cooktop system with multiple burners, which is capable of accommodating different cooking functions such as a wok or a griddle, and having an improved cooking control for accurately controlling the burner temperatures to meet consumers' different cooking needs.

SUMMARY OF THE INVENTION

The claimed invention overcomes one or more of the disadvantages known in the art. The present invention relates to a control for a gas cooktop, and particularly relates to a digital cooktop system with a plurality of individual burners with three different cooking modes. The invention includes a digital cooktop apparatus with six regular burners and a wok burner, allowing the use of a reconfigurable control knob to control the gas burners for a wok mode, a griddle mode, and a six-burner mode. Additionally, the invention will enable the user to de-rate one or more regular burners in the wok mode to pass the American National Standards Institute (ANSI) testing. In other aspects and embodiments, the user may use a duty cycle for burners operation in a griddle mode to provide a uniform heat for the griddle.

In various embodiments, the digital cooktop system disclosed herein may include a cooktop having a plurality of burners arranged in a substantially rectangular shape. The cooktop may include a left front burner and a left rear burner on a left side, a right front burner and a right rear burner on a right side, and a center front burner and a center rear burner in a middle portion. The cooktop may also include a center wok burner centrally positioned between the center front burner and the center rear burner. The BTU rating of the center wok burner may be higher than the BTU rating of the other burners on the cooktop.

In yet further aspects and embodiments, the digital cooktop system may include a processor and concomitant data memory. The processor may include a plurality of inputs and outputs for receiving and providing electrical signals to a plurality of electrical components of the digital cooktop system. The digital cooktop system may also include a user interface operatively coupled to the processor. At least one sensor may be provided proximate the center wok burner. The sensor may have an output representative of a presence of a wok or a griddle. The digital cooktop system may also include a gas valve in fluid communication with each of the burners. The gas valve may have a valve actuator that accepts an output from the processor representative of a gas valve position to control the supply of gas to the burners. At least one control knob may be assigned to at least one of the burners. The control knob may have an output representative of the gas valve position operatively coupled to an input of the processor.

In yet further aspects and embodiments, a user may use the user interface to select which burner to be controlled. The user interface may also include a wok mode selection, a griddle mode selection, and a six-burner mode selection, so a user may choose which cooking mode to be used based on their needs using the user interface. The processor may be configured to control the burners in the wok mode, the griddle mode, and the six-burner mode.

In other embodiments, the processor may be configured to activate the wok mode automatically in response to receiving an output from the sensor when the wok is placed over the center wok burner. The processor may be configured to activate the griddle mode automatically in response to receiving an output from the sensor when the griddle is placed over the center front burner, the rear burner, and the center wok burner. The processor may also be configured to activate the six-burner mode in response to a mode selection by a user using the user interface. In the six burner mode, the cooktop may be used as a regular cooktop with six burners by deactivating the center wok burner.

Additionally, in some aspects and embodiments of the present invention, the digital cooktop system described herein may have the capability to use a single control knob to control the burners in the wok mode, the griddle mode, and the six burner mode.

In yet further aspects and embodiments, the digital cooktop system disclosed herein may permit a user to control the center front burner, the center rear burner, and the center wok burner simultaneously as one heating element in the griddle mode. In various embodiments, the processor may be configured to set the heat output of the center front burner, the center rear burner, and the center wok burner in the griddle mode. The processor may also be configured to cycle on and off the center front burner, the center rear burner, and the center wok burner with a configurable duty cycle in the griddle mode.

The digital cooktop system in accordance with some aspects may be configured to detect a presence of a wok or a griddle on a center wok burner with a sensor; and initiate a wok mode or a griddle mode automatically in response to the presence of the wok or the griddle on the center wok burner. In these embodiments, the digital cooktop system may be further configured to de-rate one or more heat output of the burners automatically to have a total heat output within a certain limit range.

As used herein for purposes of the present disclosure, the term "appliance" should be understood to be generally synonymous with and include any device that consumes electrical power and can be connected to an electrical circuit or battery, for example one used in a residential or commercial setting to accomplish work. The appliances referred to herein may include a plurality of electrically operated components powered by the circuit, the components operable by manipulation of control knobs or selectors. The appliances referred to herein may also include a gas supply or source and one or more gas valves for supplying gas to a burner or heating element. The appliance gas valves may be controlled by a selector or knob, either directly or indirectly, and the appliance may also include a processor or processors that operate, control and monitor the appliance and the various components and functions thereof referred to throughout this specification.

The terms "knob" or "selector" are used herein generally to describe various devices that are operatively coupled to functional components of the appliance and which may typically, but not exclusively, be operated by hand by a user. Typical control knobs and selectors include but are not limited to gas and electric burner controls, gas and electric oven controls, lighting and timing controls, start and stop controls, switches, sliders, pushbuttons, wheels, levers, and various other functional controls associated with an appliance. "Selector" may also be used to refer to a programmed button selection on a touch-screen or similar user interface.

The term "controller" or "processor" is used herein generally to describe various apparatus relating to the operation of the system and the appliances referred to herein. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), programmable logic controllers (PLCs), and field-programmable gate arrays (FPGAs).

A processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

The term "Internet" or synonymously "Internet of things" refers to the global computer network providing a variety of information and communication facilities, consisting of interconnected networks using standardized communication protocols. The appliances, controllers and processors referred to herein may be operatively connected to the Internet.

It should be appreciated that all combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

In the drawings, like reference characters generally refer to the same parts throughout the different views. The drawings are not necessarily to scale. Emphasis is instead generally placed upon illustrating the principles of the disclosure, wherein.

DETAILED DESCRIPTION OF THE INVENTION

Figure 1:
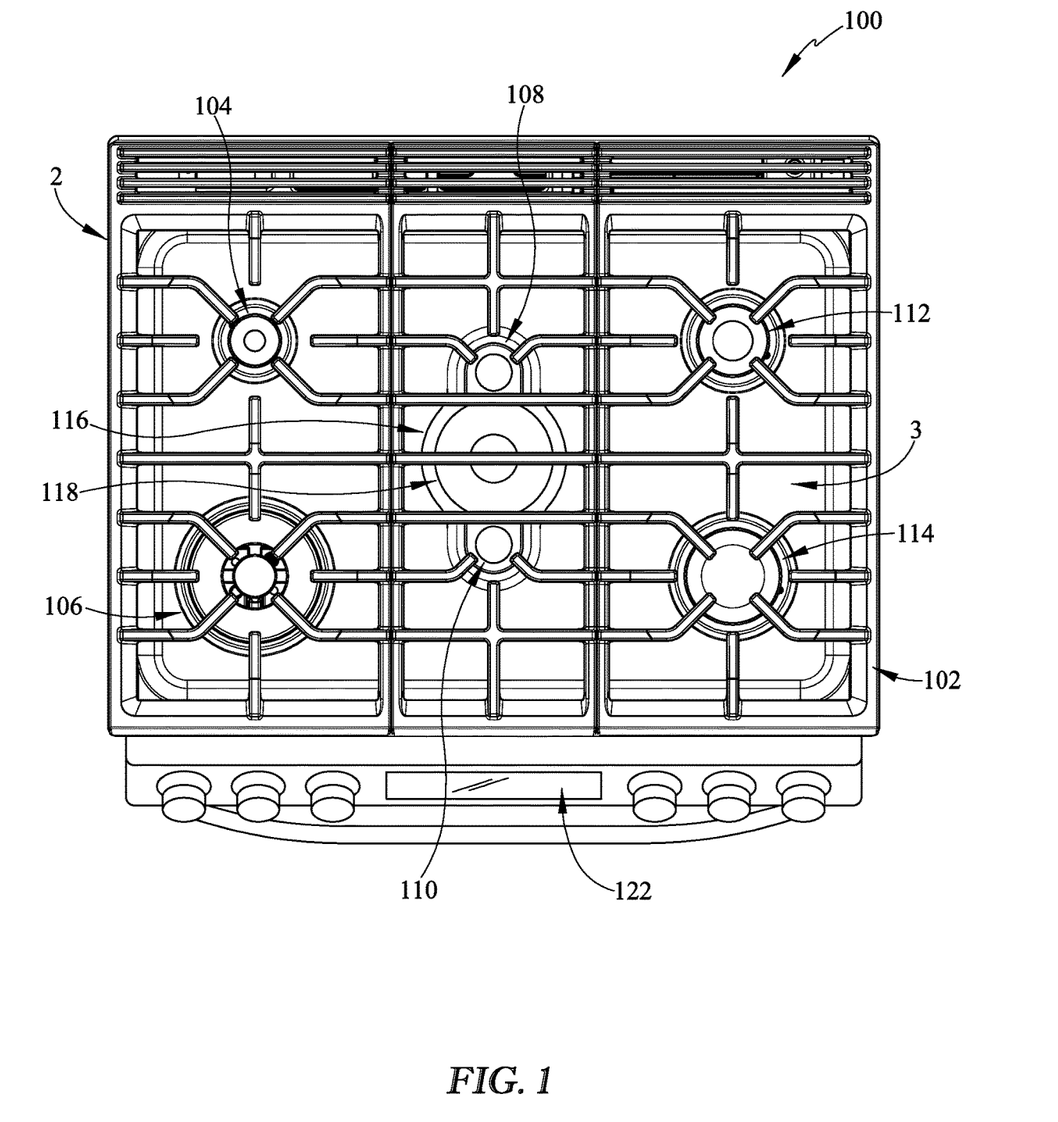
FIG. 1 is a top view of a digital cooktop system having a plurality of burners in accordance with various embodiments.
Figure 2:
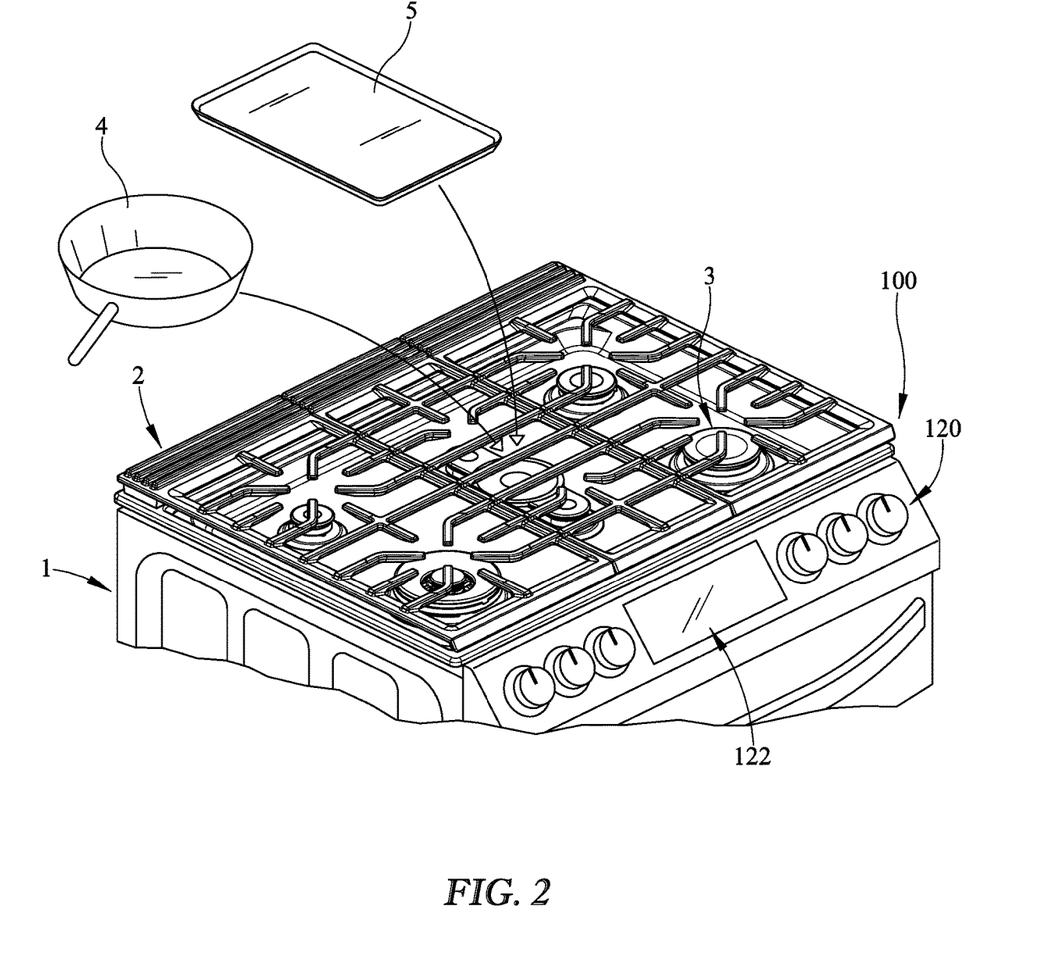
FIG. 2 is a perspective view of a digital cooktop system having a plurality of burners in accordance with various embodiments.

Referring to drawing FIGS. 1-2, and in accordance with various aspects and embodiments of the invention, a digital cooktop system 100 including six regular burners 104, 106, 108, 110, 112, and 114, and a wok burner 116 is arranged on a cooktop 102. A cooking appliance 1 in which the digital cooktop system 100 is implemented includes a controller integral to cooking appliance 1 that operates cooking appliance 1 and implements various embodiments and aspects of the digital cooktop system 100 as described herein. Digital cooktop system 100 may also include a user control panel 122 and at least one control knob 120 that are utilized to operate digital cooktop system 100. Digital cooktop system 100 may be programmed with three different cooking modes—a wok mode, a griddle mode, and a six-burner mode to meet consumers' different cooking needs as will be described further below.

FIGS. 1-2 illustrate digital cooktop system 100 in accordance with an exemplary embodiment. In this example, cooking appliance 1 is shown as a range but in alternate embodiments cooking appliance 1 can be, for example, any suitable cooking appliance having individually operable surface heating elements including, but not limited to, stoves, cabinet cooktops, and portable grilling units. As illustrated in FIG. 1, digital cooktop system 100 includes a plurality of independently controllable burners. Cooktop 102 of digital cooktop system 100 is provided with six regular burners—a left rear burner 104, a left front burner 106, a center rear burner 108, a center front burner 110, a right rear burner 112, and a right front burner 114. This embodiment also includes a center wok burner 116 with a high BTU rating, for example an output rating of 200,000 BTU's or more. The six regular burners 104, 106, 108, 110, 112, and 114, and center wok burner 116 are mounted on a generally flat recessed surface 3 of cooktop 102, which is below a grate frame 2 on which pots, pans, griddles, woks, and other cooking utensils can be placed over the burners. The center wok burner 116 may be used by a wok 4 with a wok ring placed on top of a grate frame 2, as will be described in more detail below. A griddle 5 may also be placed over center rear burner 108, center front burner 110, and center wok burner 116, along a length of the center burner portion as indicated in FIG. 2, to provide consumers with a griddle cooking mode. The six regular burners 104, 106, 108, 110, 112, and 114, and center wok burner 116 may be any suitable gas heating elements with any suitable heat output ratings. For example, the seven burners may all have the same heat rating, or one or more of the seven burners may have heat ratings different from that of other burners, so long as the ANSI cooktop testing requirement is satisfied.

In some embodiments, cooktop 102 is also provided with a user control panel 122 and a plurality of control knobs 120 in a front panel of digital cooktop system 100 immediately below the front edge of cooktop 102. Alternatively, user control panel 122 and control knob 120 may be positioned in or on cooktop 102 itself or elsewhere. Control knob 120 typically includes a rotary knob for each burner to turn the respective burner on or off and to adjust the amount of heat produced when the burner is on. Control knob 120 may also include one or more controls for an oven or other parts of cooking appliance 1. User control panel 122 may include a touch screen and display and thus be configurable to receive inputs from a user such as which burner to be activated, deactivated, controlled, and which cooking mode to be selected, etc. User control panel 122 may also be configured to display any suitable information related to the operation of cooking appliance 1.

In addition, at least one wok/griddle sensor 118 that is configured to sense the presence of wok 4 or griddle 5 placed over center wok burner 116 may be provided proximate center wok burner 116. Sensor 118 may be configured to send an output to the controller integral to cooking appliance 1 to activate the wok mode or the griddle mode automatically in response to the detection of the presence of wok 4 or griddle 5 over center wok burner 116. Sensor 118 may be an optical sensor, a proximity sensor, a weight sensor, a magnetic sensor, a conductive sensor, an image sensor, or an inductive piezoelectric sensor, etc. Additional sensors 118 may also be provided proximate center rear burner 108 and center front burner 110 to increase the accuracy of the detection of the presence of griddle 5.

Grate frame 2 is usually placed above cooktop 102 to provide a mounting surface for cooking utensils with different sizes and designs. Grate frame 2 may be removed by hand easily for cleaning or replacement. Grate frame 2 may be constructed of or with any suitable material. For example, grate frame 2 may be constructed of or with a single piece of cast metal.

Figure 3:
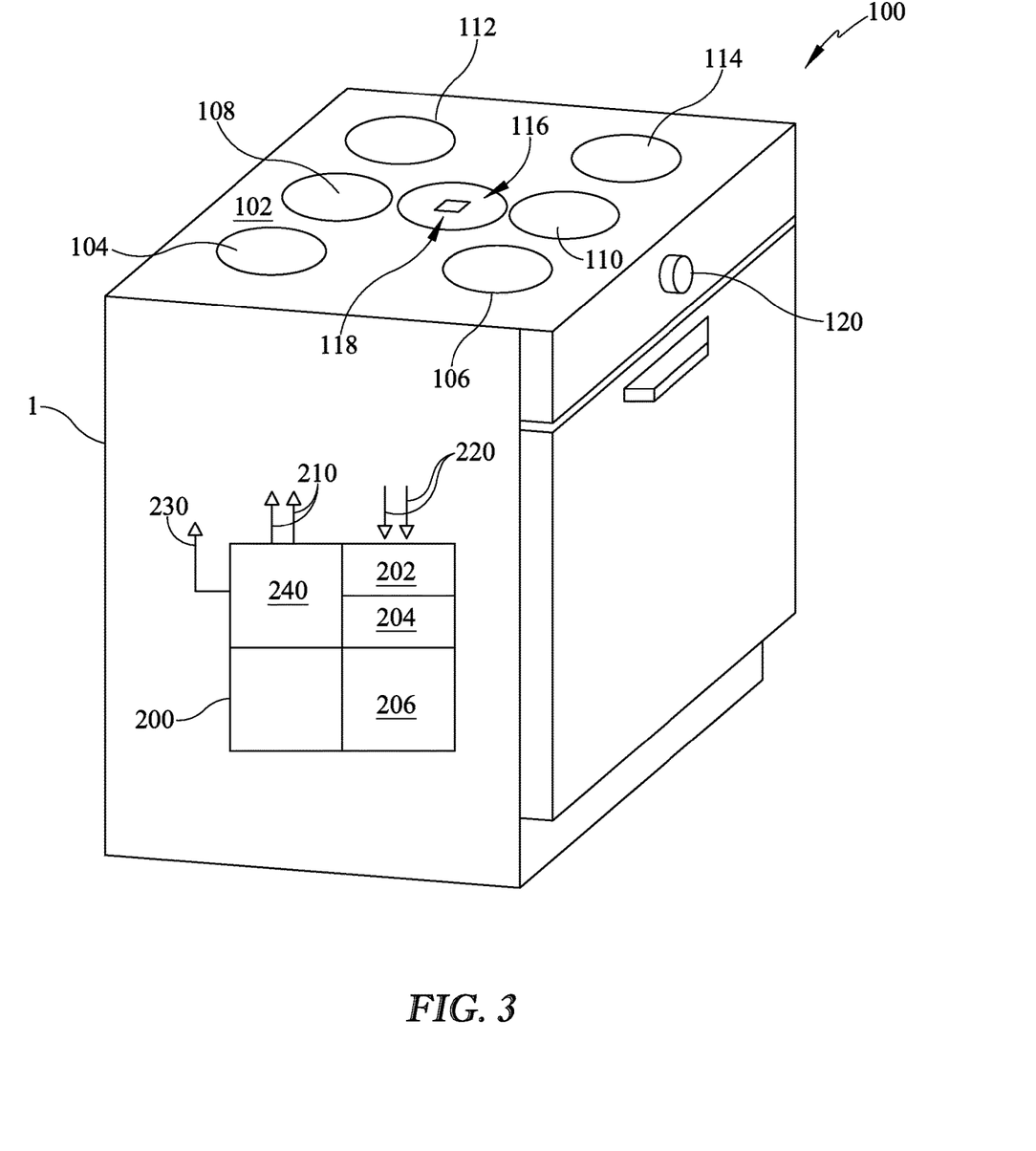
FIG. 3 is a block diagram of a control system that may be used in conjunction with a digital cooktop system in accordance with various embodiments.

FIG. 3 illustrates an exemplary hardware environment for implementing digital cooktop system 100. In some aspects digital cooktop system 100 may include a controller 200, a processor or processors 202, and concomitant memory 204. Cooking appliance 1 may further comprise a plurality of signal outputs 210 and signal inputs 220 that may be operatively connected to a plurality of cooking appliance 1 components to monitor and direct digital cooktop system 100 operation. Furthermore, in some embodiments controller 200 may include a wireless or hard-wired communications interface 230 that enables controller 200 to communicate with external devices or communications networks such as the internet, that may be integrated into digital cooktop system 100.

Additionally, controller 200 may be equipped with a user interface 240 to provide audible or visual feedback to a user as well as provide a user the ability to provide instructions or commands to controller 200. Exemplary but non-limiting user interfaces that may be employed include a mouse, keypads, touch-screens, keyboards, switches and/or touch pads or even wirelessly connected cell phones. Any user interface 240 may be employed for use in the invention without departing from the scope thereof. It will be understood that FIG. 3 constitutes, in some respects, an abstraction and that the actual organization of the components of digital cooktop system 100 and controller 200 may be physically arranged differently, and may be more complex than illustrated. Furthermore, in some embodiments user control panel 122 may function as user interface 240, accepting user inputs and displaying visual and/or audible feedback to a user indicative of cooktop 102 operation.

Processor 202 may be any hardware device capable of executing instructions stored in memory 204 or data storage 206 or otherwise processing data. As such, processor 202 may include a microprocessor, field programmable gate array (FPGA), application-specific integrated circuit (ASIC), or other similar devices.

Memory 204 may include various memories such as, for example L1, L2, or L3 cache or system memory. As such, memory 204 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

User interface 240 may include one or more devices for enabling communication with a user such as an administrator. For example, user interface 240 may include a display, a mouse, and a keyboard for receiving user commands. In some embodiments, user interface 240 may include a command line interface or graphical user interface that may be presented to a remote terminal via the communication interface 230.

Communication interface 230 may include one or more devices for enabling communication with other hardware devices. For example, communication interface 230 may include a network interface card (NIC) configured to communicate according to the Ethernet protocol. Additionally, communication interface 230 may implement a TCP/IP stack for communication according to the TCP/IP protocols. Various alternative or additional hardware or configurations for communication interface 230 will be apparent.

Storage 206 may include one or more machine-readable storage media such as read-only memory (ROM), random-access memory (RAM), magnetic disk storage media, optical storage media, flash-memory devices, or similar storage media. In various embodiments, storage 206 may store instructions for execution by processor 202 or data upon with processor 202 may operate. For example, storage 206 may store a base operating system for controlling various basic operations of the hardware. Other instruction sets may also be stored in storage 206 for executing various functions of digital cooktop system 100, in accordance with the embodiments detailed below.

It will be apparent that various information described as stored in storage 206 may be additionally or alternatively stored in memory 204. In this respect, memory 204 may also be considered to constitute a "storage device" and storage 206 may be considered a "memory." Various other arrangements will be apparent. Further, memory 204 and storage 206 may both be considered to be "non-transitory machine-readable media." As used herein, the term "non-transitory" will be understood to exclude transitory signals but to include all forms of storage, including both volatile and non-volatile memories.

While controller 200 is shown as including one of each described component, the various components may be duplicated in various embodiments. For example, processor 202 may include multiple microprocessors that are configured to independently execute the methods described herein or are configured to perform steps or subroutines of the methods described herein such that the multiple processors cooperate to achieve the functionality described herein.

Figure 4:
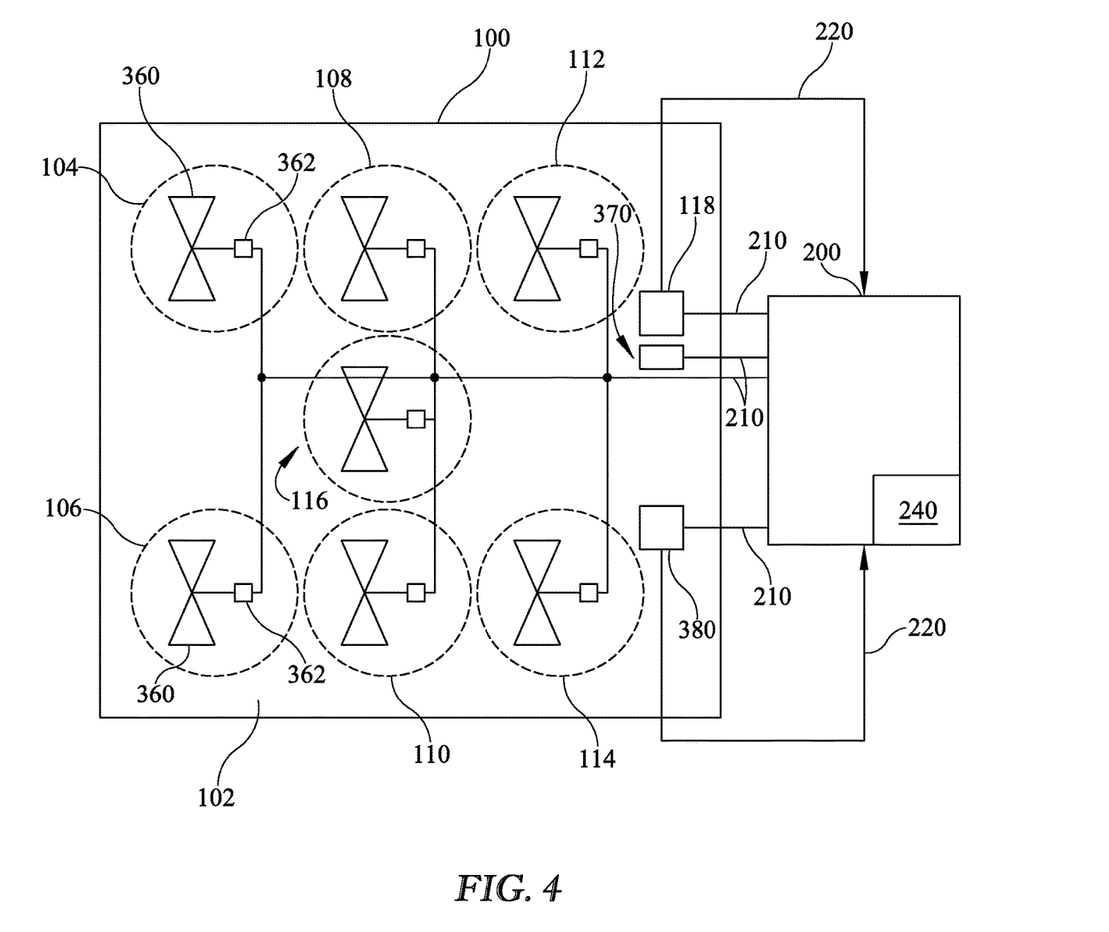
FIG. 4 is a schematic of a plurality of gas control valves and burners in accordance with various embodiments.
Figure 5:
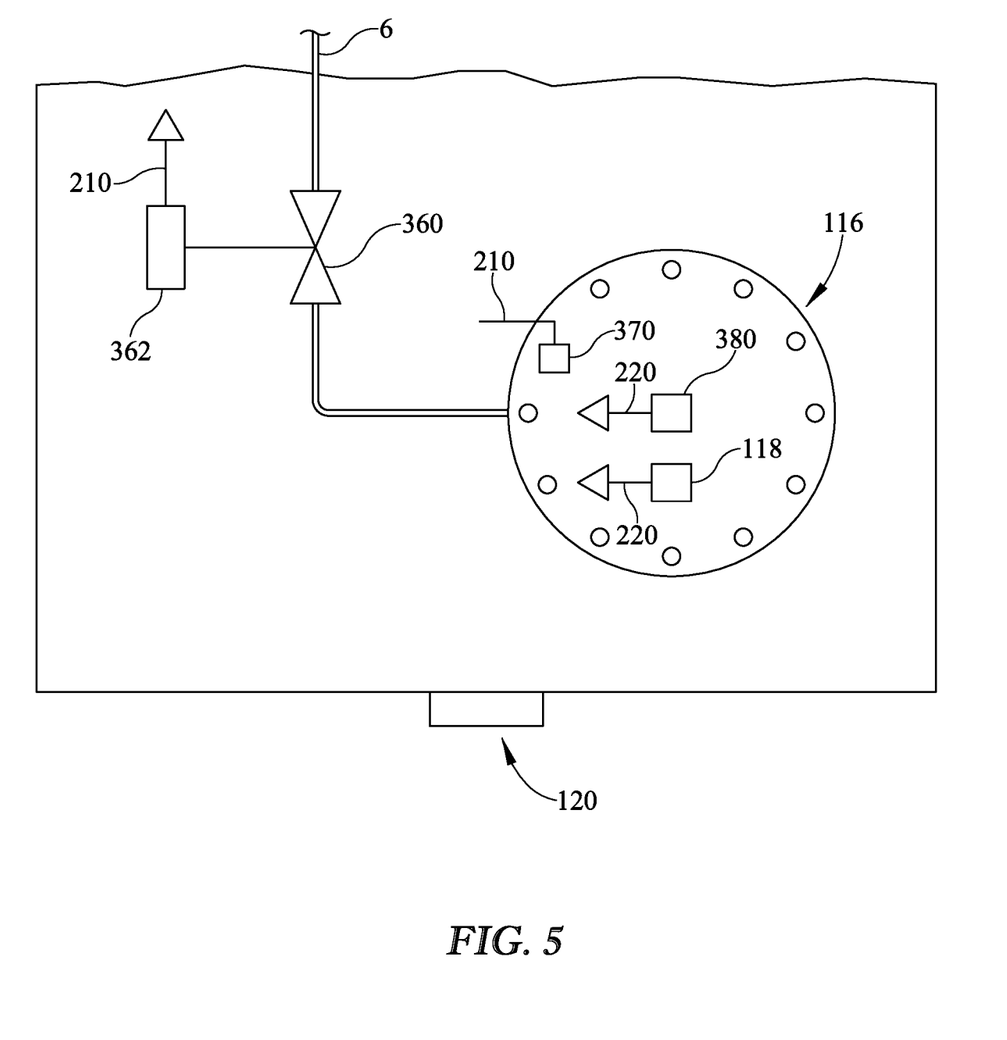
FIG. 5 is a schematic of a gas control valve and burner in accordance with some various embodiments.

As best seen in FIGS. 4-5 and in accordance with some aspects of digital cooktop system 100, gas valves 360 may situated to provide a supply of gas to burners 104, 106, 108, 110, 112, 114, and 116. Each gas valve 360 may in some embodiments include an actuator 362 that accepts an output 210 from controller 200 representative of gas valve 360 position. Each gas valve 360 thus supplies gas 6 to a burner, or in some embodiments to a plurality thereof. Additionally, each burner may include an igniter 370 for igniting the burner that is actuated by an output 210 from controller 200. A plurality of temperature sensors 380 may also be provided for each burner to provide a signal input 220 to processor 202 representative of a burner temperature. At least one wok/griddle sensor 118 may be provided for center wok burner 116 to provide a signal input 220 to processor 202 representative of the presence of wok 4 or griddle 5 over center wok burner 116. Additional sensors 118 may also be provided for center rear burner 108 and center front burner 110 to provide a signal input 220 to processor 202 representative of the presence of griddle 5.

In one non-limiting exemplary embodiment for purposes of illustration in this specification, cooking appliance 1 may be a conventional stove, or equivalently a cooktop and oven combination. Cooking appliance 1 may include multiple control knobs 120, for example control knobs to adjust the flow of gas to a plurality of gas valves 360, and thus the heat output of a plurality of cooktop burners, as well as a plurality of oven heating elements or burners (not shown). In some aspects, cooking appliance 1 may include only one control knob 120 that is assigned to individual gas valves and concomitant burners. Accordingly, as shown is FIGS. 3 and 5, a single reconfigurable control knob 120 may be configured to operate a plurality of cooktop burners as well as a plurality of oven heating elements. Other control knobs or switches may also be present, but for purpose of explication have been omitted for this example. In some aspects and embodiments, control knob 120 is turned or rotated clockwise to supply additional gas (and therefore heat) to a selected burner, and conversely turned counter-clockwise to reduce the amount of gas (and therefore heat) to a selected burner. In some aspects and embodiments, control knob 120 may be rotated in a first direction to increase the open position of gas valve 360, and rotated in an opposite direction to reduce the open position of gas valve 360.

In some aspects of the invention, the plurality of control knobs 120 may be mounted to or secured to a plurality of encoders that supply a plurality of inputs 220 to controller 200 representative of a desired gas valve 360 position (or burner heat level), whereby controller 200 provides corresponding outputs 210 to control the plurality of gas valves 360. In one exemplary embodiment, digital cooktop system 100 includes at least one control knob 120 for setting a desired gas valve 360 position, or alternatively burner power level. Throughout the specification, gas valve 360 position and burner power level and/or heat level will be referred to interchangeably. It should be understood that the position of a specified gas valve 360 will dictate the power level and/or heat level of its associated burner.

In some aspects of the invention, controller 200 may be configured to control the plurality of burners in three different cooking modes. In the first mode—a wok mode, only center wok burner 116 is used. Wok 4 may be placed over center wok burner 116 with the addition of an optional wok ring over grate frame 2. Once wok 4 is present, sensor 118 that is configured to detect the presence of wok may send an input 220 to controller 200 to enable controller 200 initiate the wok mode automatically. In some embodiments, controller 200 may be configured to de-rate the heat output of one or more of the other six regular burners 104, 106, 108, 110, 112, and 114 in order to pass the ANSI cooktop testing requirement when center wok burner 116 is activated in the wok mode. For example, section 5.16.3 of the ANSI Z21.1 standard requires that a cloth ignition test is performed with all cooktop burners running at maximum rates. If certain combinations of burners run at high rates simultaneously, it may result in a failure of the test because the total combined heat output of the cooktop burners may be over the maximum limit set by the ANSI standard. In some embodiments, controller 200 may be configured to limit the maximum heat output of certain burners in certain testing situations to avoid a failure of the test according to the ANSI standard. Also, in some embodiments, a single reconfigurable control knob 120 may be the only control knob equipped for the digital cooktop system 100, and configured by processor 202 to independently control center wok burner 116 when the wok mode is activated.

In a second operational mode—a griddle mode, griddle 5 may be provided for digital cooktop system 100 for a griddle cooking function. Griddle 5 may be placed over the center burner portion of cooktop 102, covering center rear burner 108, center front burner 110, and center wok burner 116, along a length of the three burners. Once griddle 5 is present, sensor 118 that is configured to detect the presence of griddle may send an input 220 to controller 200 to enable controller 200 to initiate the griddle mode automatically. In some embodiments, controller 200 may be configured to de-rate the heat output of center wok burner 116, and activate center rear burner 108 and center front burner 110 to provide a uniform heat for the entire cooking surface of griddle 5.

In some embodiments, a single reconfigurable control knob 120 may be configured by controller 200 to selectively and simultaneously control center rear burner 108, center front burner 110, and center wok burner 116 as one heating element to provide a uniform heat for the entire cooking surface of griddle 5. In some embodiments, controller 200 may be configured to adopt a duty cycle for center rear burner 108, center front burner 110, and center wok burner 116 to maintain an optimal uniformity of temperature for the entire cooking surface of griddle 5. For example, controller 200 may be configured to cycle center wok burner 116 off longer than center rear burner 108 and center front burner 110 to provide an even temperature for the entire cooking surface of griddle 5. In addition, in some embodiments, controller 200 may be configured to set the heat outputs of the center rear burner 108, center front burner 110, and center wok burner 116 to produce a uniform heat for the entire cooking surface of griddle 5. These heat output rates may be determined through testing, and programmed differently based on whether a user intends to warm up griddle 5, to maintain a certain temperature of griddle 5, or to change the cooking temperature based on the food cooked on griddle 5. Controller 200 may also be configured to incorporate a temperature feedback mechanism to facilitate determining the heat output rates.

In some embodiments, besides triggering automatically by sensor 118 sending input 220 to controller 200 by detecting the presence of wok 4 or griddle 5, the wok mode and the griddle mode may also be triggered by a mode selection using user interface 240. For example, the wok mode or the griddle mode may be activated by a user depressing a button or selecting an icon on a touch screen.

In some embodiments a the third mode of burner operation may be employed—a six-burner mode—wherein digital cooktop system 100 may be used as a standard six burner cooktop, with center wok burner 116 disabled. In this cooking mode, just like a regular six-burner cooktop, the six regular burners 104, 106, 108, 110, 112, and 114 may be able to be operated independently with a potential higher BTU rating compared with the wok mode or the griddle mode. In some embodiments, a single reconfigurable knob 120 may be the only control knob that is configured by processor 202 to control all six regular burners 104, 106, 108, 110, 112, and 114 independently.

For purposes of description herein the terms "right", "left", "rear", "front", "center" and derivatives thereof shall relate to the device as oriented in FIG. 1. However, it is to be understood that the invention may assume various alternative orientations and step sequences, except where expressly specified to the contrary. It is also to be understood that the specific devices and process illustrated in the attached drawings, and described in the following specifications are simply exemplary embodiments of the inventive concepts defined in the appended claims. Hence, specific dimensions and other physical characteristics relating to the embodiments disclosed herein are not to be considered as limiting, unless the claims expressly state otherwise.

While a variety of inventive embodiments have been described and illustrated herein, those of ordinary skill in the art will understand that a variety of other methods, systems, and/or structures for performing the function and/or obtaining the results, and/or one or more of the advantages described herein are possible, and further understand that each of such variations and/or modifications is within the scope of the inventive embodiments described herein. Those skilled in the art will understand that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A digital cooktop system, comprising:
   a cooktop having a plurality of burners arranged in a substantially rectangular shape, including a left front burner and a left rear burner on a left side of the cooktop, a right front burner and a right rear burner on a right side of the cooktop, a center front burner and a center rear burner in a middle portion of the cooktop between the left side and the right side thereof, and a center wok burner with a BTU rating higher than one or more of the other burners, centrally positioned between the center front burner and the center rear burner;
   a processor and concomitant data memory, the processor having a plurality of inputs and outputs for receiving and providing electrical signals to a plurality of electrical components of the digital cooktop system;
   a user interface operatively coupled to the processor;
   at least one sensor proximate the center wok burner having an output representative of a presence of a wok or a griddle;
   a gas valve in fluid communication with each of the plurality of burners having a valve actuator that accepts an output from the processor representative of a gas valve position to control the supply of gas to the plurality of burners; and
   at least one control knob assigned to at least one of the plurality of burners having an output representative of the gas valve position operatively coupled to an input of the processor.

2. The digital cooktop system of claim 1, wherein the user interface is configured to receive an input from a user indicative of one of the plurality of burners to be controlled.

3. The digital cooktop system of claim 2, wherein the user interface includes a wok mode selection, a griddle mode selection, and a six-burner mode selection.

4. The digital cooktop system of claim 3, wherein the processor is configured to control the plurality of burners in the wok mode, the griddle mode, and the six-burner mode.

5. The digital cooktop system of claim 4, wherein the processor is configured to activate the wok mode automatically in response to receiving an output from the sensor when the wok is placed over the center wok burner.

6. The digital cooktop system of claim 5, wherein a single control knob is configured by the processor to control a heat output of the center wok burner independently in the wok mode.

7. The digital cooktop system of claim 4, wherein the processor is configured to activate the griddle mode automatically in response to receiving an output from the sensor when the griddle is placed over the center front burner, the center rear burner, and the center wok burner.

8. The digital cooktop system of claim 7, wherein the processor is configured to de-rate the heat output of the center wok burner, and activate the center rear burner and the center front burner automatically in the griddle mode.

9. The digital cooktop system of claim 7, wherein a single control knob is configured by the processor to control the center front burner, the center rear burner, and the center wok burner simultaneously as one heating element in the griddle mode.

10. The digital cooktop system of claim 7, whereby the gas valves corresponding to the center front burner, the center rear burner, and the center wok burner are cycled on and off by providing an output from the processor to the valve actuator determined by a configurable duty cycle in the griddle mode.

11. The digital cooktop system of claim 10, wherein the configurable duty cycle is configured to cycle on and off the center wok burner for a predetermined time period.

12. The digital cooktop system of claim 7, wherein the processor is configured to set the heat output of the said center front burner, the center rear burner, and the center wok burner in the griddle mode.

13. The digital cooktop system of claim 4, wherein the processor is configured to activate the wok mode or the griddle mode in response to a mode selection by the user using the user interface, besides activate automatically in response to receiving an output from the sensor.

14. The digital cooktop system of claim 4, wherein the processor is configured to activate the six-burner mode by deactivating the center wok burner in response to a mode selection by the user using the user interface.

15. The digital cooktop system of claim 14, wherein a single control knob control knob is configured by the processor to control the said plurality of burners except the center wok burner independently in the six-burner mode.

16. A digital cooktop system, comprising:
a cooktop having a plurality of burners arranged in a substantially rectangular shape, including a left front burner and a left rear burner on a left side of the cooktop, a right front burner and a right rear burner on a right side of the cooktop, a center front burner and a center rear burner in a middle portion of the cooktop between the left side and the right side thereof, and a center wok burner with a BTU rating higher than one or more of the other burners, centrally positioned between the center front burner and center rear burner; and
a user interface configured to operate the cooktop in a wok mode, a griddle mode, and a six-burner mode, wherein when in the wok mode, the center wok burner is controlled as an independent heating element, when in the griddle mode the center wok burner, the center front burner and the center rear burner are controlled as one heating element, and when in the six-burner mode the center wok burner is disabled and the center front burner and the center rear burner are operated as independent heating elements.

17. The digital cooktop system of claim 16, wherein each of the plurality of burners is a gas burner, and wherein the digital cooktop system further includes a plurality of gas valves in fluid communication with the plurality of burners.

18. A method of operating a digital cooktop system having first and second burners, comprising:
detecting a presence of a wok or a griddle on the first burner with a sensor; and
initiating a wok mode or a griddle mode automatically in response to the presence of the wok or the griddle on the first said center wok burner, wherein when in the wok mode, the first burner is controlled as an independent heating element from the second burner, and when in the griddle mode the first and second burners are controlled as one heating element.

19. The method of claim 18, further comprising:
configuring a single control knob to control an output level of the first burner in the wok mode and control the output level of the first burner and an output level of the second burner in the griddle mode.

20. The method of claim 18, further comprising:
de-rating a heat output of the second burner automatically when in the wok mode.

* * * * *